US008666887B2

(12) United States Patent
Elterich

(10) Patent No.: US 8,666,887 B2
(45) Date of Patent: Mar. 4, 2014

(54) FINANCIAL ACCOUNT MANAGEMENT

(75) Inventor: Steve Elterich, Canton, MA (US)

(73) Assignee: FMR LLC, Boston, MA (US)

( * ) Notice: Subject to any disclaimer, the term of this patent is extended or adjusted under 35 U.S.C. 154(b) by 87 days.

(21) Appl. No.: 12/254,390

(22) Filed: Oct. 20, 2008

(65) Prior Publication Data
US 2009/0043699 A1 Feb. 12, 2009

Related U.S. Application Data

(62) Division of application No. 10/739,597, filed on Dec. 17, 2003, now Pat. No. 8,069,113.

(51) Int. Cl.
*G06Q 40/00* (2012.01)
(52) U.S. Cl.
USPC .............................. 705/39; 705/35
(58) Field of Classification Search
None
See application file for complete search history.

(56) References Cited

U.S. PATENT DOCUMENTS

| 5,848,400 | A | 12/1998 | Chang |
| 7,117,172 | B1 | 10/2006 | Black |
| 7,248,855 | B2 | 7/2007 | Joyce et al. |
| 2002/0069077 | A1* | 6/2002 | Brophy et al. ............. 705/1 |
| 2002/0091635 | A1* | 7/2002 | Dilip et al. ................ 705/39 |
| 2002/0091637 | A1 | 7/2002 | Bent et al. |
| 2002/0174048 | A1 | 11/2002 | Dheer et al. |
| 2003/0023573 | A1* | 1/2003 | Chan et al. ............... 706/47 |
| 2003/0105711 | A1 | 6/2003 | O'Neil |
| 2003/0177079 | A1* | 9/2003 | Krajewski et al. .......... 705/35 |
| 2004/0002910 | A1* | 1/2004 | Mizukami ................... 705/36 |
| 2004/0117407 | A1* | 6/2004 | Kumar et al. ............... 707/200 |
| 2004/0133876 | A1* | 7/2004 | Sproule ..................... 717/105 |

OTHER PUBLICATIONS

Inititation of Retail Sweep Programs, Federal Reserve Bulletin, Nov. 1997, p. 870.*
Initiation of Retail Sweep Programs, Federal Reserve Bulletin, Nov. 1997, p. 870.*
U.S. Appl. No. 10/739,597, Office Action mailed Aug. 20, 2007.
U.S. Appl. No. 10/739,597, Reply to Office Action mailed Aug. 20, 2007, Reply filed Oct. 12, 2007.
U.S. Appl. No. 10/739,597, Office Action mailed Mar. 18, 2008.
U.S. Appl. No. 10/739,597, Reply to Office Action mailed Mar. 18, 2008, Reply filed Jun. 24, 2008.
U.S. Appl. No. 10/739,597, Office Action mailed Sep. 26, 2008.
U.S. Appl. No. 10/739,597, Reply to Office Action mailed Sep. 26, 2008, Reply filed Nov. 10, 2008.
U.S. Appl. No. 10/739,597, Office Action mailed Feb. 24, 2009.
U.S. Appl. No. 10/739,597, Reply to Office Action mailed Feb. 24, 2009, Reply filed Jun. 2, 2009.
U.S. Appl. No. 10/739,597, Office Action mailed Aug. 31, 2009.
U.S. Appl. No. 10/739,597, Reply to Office Action mailed Aug. 31, 2009, Reply filed Nov. 18, 2009.

(Continued)

*Primary Examiner* — Rajesh Khattar
*Assistant Examiner* — Carol See
(74) *Attorney, Agent, or Firm* — Fish & Richardson P.C.

(57) ABSTRACT

An automated account management system provides a user with the ability to establish rules that dictate how the account management system is to manage the user's accounts. Once the user specifies a set of rules, the system automatically manages multiple accounts across multiple financial institutions in accordance with the user-defined rules. Other features, such as an on-line bill payment system, a money transfer system, and a retirement planning system, may be integrated within the automated account management system to provide the user with even greater control over his or her financial assets.

20 Claims, 4 Drawing Sheets

(56) References Cited

OTHER PUBLICATIONS

U.S. Appl. No. 10/739,597, Office Action mailed Feb. 5, 2010.
U.S. Appl. No. 10/739,597, Reply to Office Action mailed Feb. 5, 2010, Reply filed Jun. 3, 2010.
U.S. Appl. No. 12/254,373, Appeal Brief filed Jul. 8, 2010.
U.S. Appl. No. 12/254,373, Office Action mailed Jan. 11, 2010.
U.S. Appl. No. 12/254,373, Reply to Office Action mailed May 29, 2009, Reply filed Sep. 16, 2009.
U.S. Appl. No. 12/254,373, Office Action mailed May 29, 2009.
U.S. Appl. No. 12/254,475, Office Action mailed Apr. 1, 2010.
U.S. Appl. No. 12/254,475, Reply to Office Action mailed Sep. 17, 2009, Reply filed Dec. 9, 2009.
U.S. Appl. No. 12/254,475, Office Action mailed Sep. 17, 2009.
U.S. Appl. No. 10/739,597, Office Action mailed Aug. 19, 2010.
U.S. Appl. No. 10/739,597, Reply to Office Action mailed Aug. 19, 2010, Reply filed Nov. 17, 2010.
U.S. Appl. No. 12/254,373, Office Action mailed Oct. 6, 2010.
U.S. Appl. No. 12/254,475, Appeal Brief filed Nov. 1, 2010.
U.S. Appl. No. 12/254,475, Office Action mailed Feb. 2, 2011.
U.S. Appl. No. 12/254,475, Appeal Brief filed Jul. 29, 2011.
U.S. Appl. No. 12/254,475, Office Action mailed Oct. 19, 2011.
Feigenbaum, Randi, "Shining Light on Low-Cost Accounts" DIALOG® File 638, Newsday/New York Newsday, 2011, 2 pages.
Mohl, Bruce, "Consumer Beat" Boston Globe Newspaper, Jan. 5, 2003, 2 pages.
Examination Report dtd. Feb. 7, 2013 of application 3322/DELNP/2008: 2 pages.

* cited by examiner

FINANCIAL ACCOUNT MANAGEMENT

RELATIONSHIP TO OTHER APPLICATIONS

This patent application is a divisional of U.S. patent application Ser. No. 10/739,597, filed on Dec. 17, 2003 now U.S. Pat. No. 8,069,113.

TECHNICAL FIELD

This description relates to managing personal financial accounts.

BACKGROUND

People commonly have their financial resources spread across accounts at multiple financial institutions, for example, a checking account at a local bank, a retirement account through an employer, and a money market through a brokerage firm. Aggregation systems, such as the iFinity Platform™ by Yodlee, Inc.™, help individuals to manage their assets by collecting and consolidating personal account data from multiple sources into a single, consolidated interface. On-line bill payment systems allow a user to negotiate checks over the Internet.

SUMMARY

In one aspect the invention features a machine-implemented method that includes receiving information from a user that specifies a particular level for a balance of a personal financial account, periodically retrieving the balance of the account, determining if the balance of the account is at the particular level, for example at a minimum or maximum account balance level, and if the balance of the account is not at the particular level, then determining an amount of funds to be transferred into or out of the account to maintain the balance at the particular level.

Embodiments may include one or more of the following features. The method may include receiving information that indicates one or more source accounts from which the user desires the transfer of funds if the balance of the account falls below the minimum account balance and receiving information indicating how funds should be transferred from the one or more source accounts.

The method may include receiving information indicating one or more target accounts to which the user desires the transfer of funds if the balance of the account exceeds the maximum account balance and receiving information indicating how funds should be transferred to one or more of the target accounts if the balance of the account exceeds the maximum account balance.

The method may also include creating a rule based on the level information received from the user and forming a user notification message indicating a transfer of funds into or out of an account. The method may also include transferring funds into or out of the account on a certain date.

In another aspect the invention features a machine-implemented method for automatically managing a personal financial account of a user maintained at one or more third party institutions that includes receiving information from the user indicating a minimum level at which balance of the account is to be maintained, storing the minimum balance value in a memory device, periodically retrieving account data about the personal financial account from the third party institution, retrieving the minimum balance value stored in memory, comparing the current balance of the account to the minimum account value, and transferring funds into the account sufficient to raise the balance to or above the minimum account value if the current balance is below the minimum account value.

Embodiments may include one or more of the following features. The method may also include receiving information from the user identifying one or more source accounts from which to transfer funds should the current account balance fall below the minimum account balance.

Another aspect of the invention features a machine-implemented method for automatically managing a personal financial account of a user maintained at one or more third party institutions that includes receiving information from the user indicating a maximum level at which balance of the account is to be maintained, storing the maximum balance value in a memory device, periodically retrieving account data about the personal financial account from the third party institution, retrieving the maximum balance value stored in memory, comparing the current balance of the account to the maximum account value, and transferring funds out of the account sufficient to lower the balance to or below the maximum account value if the current balance is above the maximum account value.

Embodiments may include one or more of the following features. The method may also include receiving information identifying one or more target accounts to which to transfer funds should the current account balance rise above the maximum account balance.

Another aspect of the invention features a system that includes a database configured to store a first balance value at which a first account should be maintained, an aggregation system configured to retrieve a current balance of at least the first account, and a rules engine configured to cause a transfer of funds between the first account and a second account based on a comparison of the current balance of the first account with the first account balance value.

Embodiments may include one or more of the following features. The rules engine may further be configured to cause a transfer of funds from the second account to the first account if the current balance of the first account is less than or greater than the first account value.

Another aspect of the invention features a machine implemented method for managing a portfolio of personal financial accounts of a user maintained at multiple financial institutions, The method includes receiving data indicating the user's preference for maintaining a minimum balance in a first account at a first financial institution, monitoring the balance of the first account, and transferring funds from a second account maintained at a second financial institution if the balance falls below the minimum balance.

Embodiments may include one or more of the following features. The method may include receiving information indicating the user's desire to transfer funds from the second account to the first account if the balance of the first account falls below the minimum balance.

The method may further include transmitting a message to the user indicating the transfer of funds from the second account to the first account. The method may, prior to transferring funds, transmit to the user a message suggesting the transfer of funds from the second account to the first account.

Another aspect of the invention features a machine-implemented method for managing a plurality of personal financial accounts maintained at multiple financial institutions. The method includes receiving data indicating a user's preference to maintain a minimum aggregate balance across a set of the plurality of personal financial accounts, receiving data that indicates the current aggregate balance of the set of personal financial accounts and transferring funds into one or more of the personal financial accounts in the set of personal financial accounts if the current aggregate balance of the set of personal financial accounts is below the minimum aggregate balance.

Embodiments may include one or more of the following features. The method may also include prompting the user for information that indicates one or more source accounts from which the user desires the transfer of funds if the current aggregate balance of the set of personal financial accounts falls below the minimum aggregate account balance. The method may include prompting the user for information that indicates how funds should be transferred from the one or more source accounts in the event that the current aggregate balance falls below the minimum aggregate account balance.

The method may also include creating a rule based on the information that indicates the user's desire to maintain the aggregate balance of a set of personal financial account at a minimum level and then storing the rule in a database. The method may include forming a notification message indicating a transfer of funds into or out of the account and transmitting the notification message to the user. The method may also, prior to transferring funds, transmit a message to the user that seeks user approval for the transfer of funds.

Other advantages and features of the invention will be apparent from the following description and from the claims.

DETAILED DESCRIPTION

An automated account management system provides a user with the ability to establish rules that specify how the system is to manage the user's personal financial accounts. Once the user specifies a set of rules, the system automatically manages multiple accounts in multiple financial institutions in accordance with the user-defined rules. Other features, such as an on-line bill payment system, a money transfer system, and a retirement planning system, may be integrated within the automated account management system to provide the user with even greater control over his or her financial accounts. A "personal financial account" or an "account" as used in this description includes any asset account, such as checking, savings, brokerage, money market, 401(k)s, IRAs, whole life insurance policies, annuities, or the like, as well as any liability account, such as mortgages, car loans, student loans, personal loans, utility accounts, home equity lines, or the like. The term "financial institution" as used in this description refers to any individual, company, corporation, partnership, government entity, or any other entity that maintains a personal financial account, and includes such entities as banks, brokerage companies, mutual fund companies, life insurance companies, mortgage companies, loan service companies, utility companies, and companies that manage pensions or 401(k) accounts.

Figure 1:
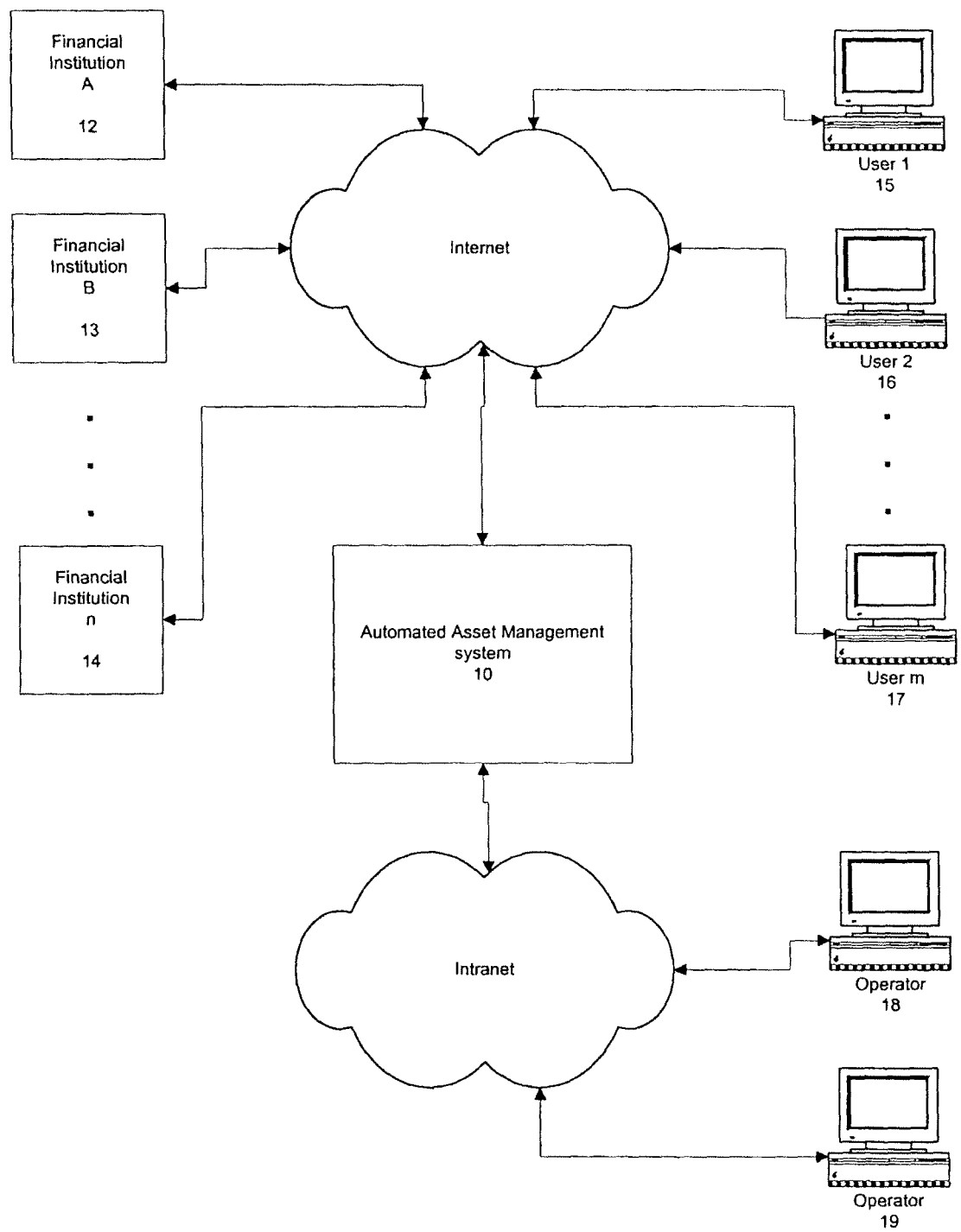
FIGS. 1 and 2 are block diagrams of an Internet-based account management system.

As shown in FIG. 1, an account management system 10 is in communication with several financial institutions 12, 13, 14 and several user terminals 15, 16, 17 using the Internet. The system 10 is also in communication with several operator terminals 18, 19 over an intranet. The operator of an operator terminals 18, 19 may be a customer service representative who may assist the user in configuring the system, but may not provide financial advice to the user, or a licensed broker or financial advisor who may provide financial advice to the user while assisting the user in configuring the account management system for the particular user. The operator may provide other services related or even unrelated to the accounts being managed. In addition to the operator terminals 18, 19, the operator has access to a telephone and facsimile machine (not shown) to facilitate communication with a user.

Figure 2:
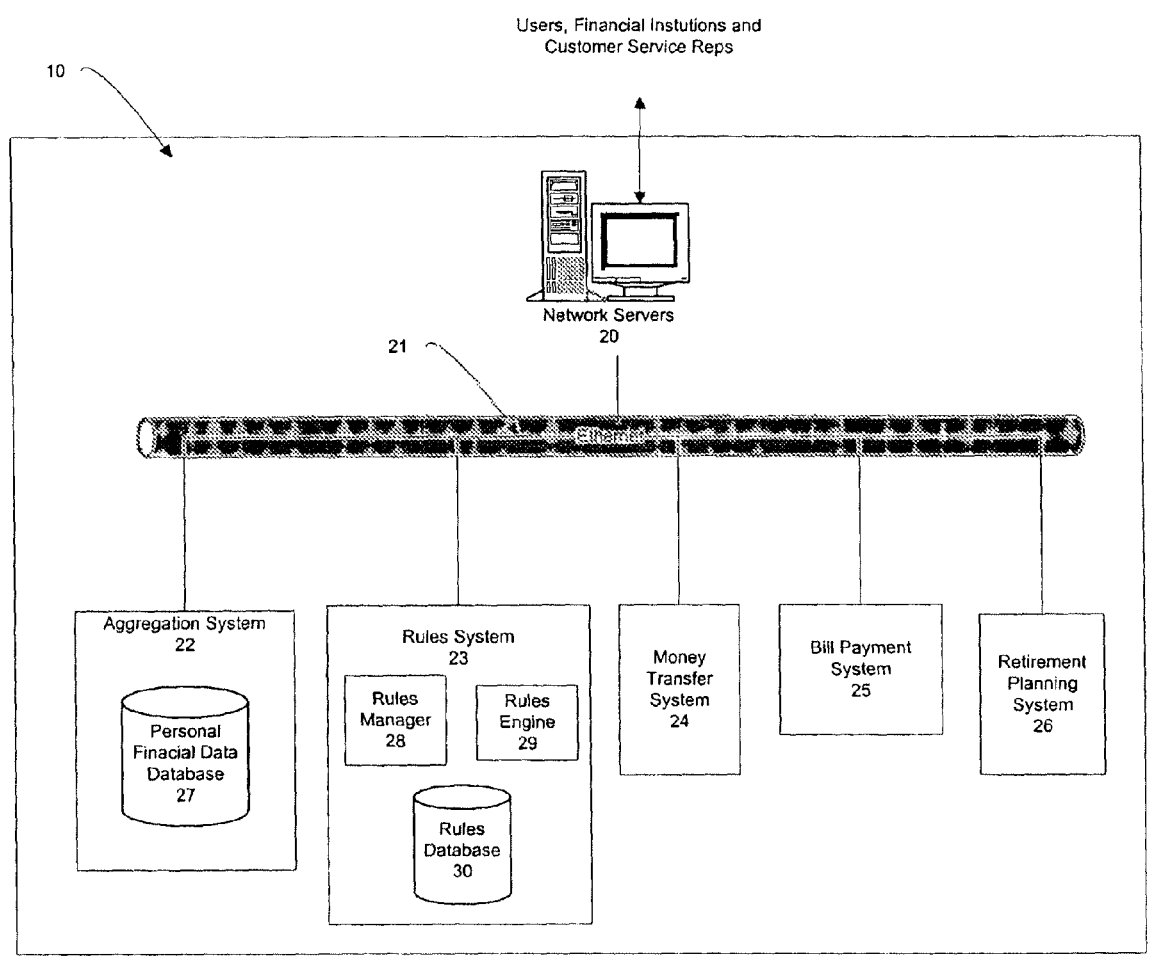

As shown in FIG. 2, the account management system 10 includes a network server 20 that manages network traffic between the account management system 10 and the users 15, 16, 17, financial institutions 12, 13, 14 and operators 18, 19. The network server 20 is in communication using a local area network 21 with an aggregation system 22, a rules engine system 23, a bill pay system 25, a money transfer system 24, and a retirement planning system 26.

The aggregation system 22 is configured to periodically (e.g., once per day) retrieve and store personal financial data for each user in a database 27. For each user, the database 27 includes account information from each of the user's accounts regardless of which financial institution maintains the account. For example, if a user maintains a checking account at Bank of America™, a money market account at Fidelity Investments™, and a mortgage account at FannieMae™, the database will include account information about all three accounts. In some implementations, the account information stored within the database is a complete record of all transactions on the account. To limit the capacity required for the database, other implementations may configure the database to include a record of all transactions on an account for a limited time period (e.g., all transactions within the past three months). In other configurations, the database may simply maintain the current balance of the account. The aggregation system 22 may be any known aggregation system, such as the Yodlee iFinity™ system, that periodically retrieves and stores account data from the various financial institutions each user maintains an asset or liability account.

The rules system 23 includes a rules manager 28, a rules database 30, and a rules engine 29. The rules manager 28 is a software program that prompts the user for information to set up rules that specify how the system 10 is to manage the user's accounts. The rules set up by each user are stored in the rules database 30 and are accessed by the rules engine 29 to automatically manage the user's accounts.

The money transfer system 24 is configured to permit a user to user to transfer money between accounts and may be any known system for facilitating electronic money transfers between accounts, such as the Fidelity Money Line™ system. The bill payment system 25 is configured to permit a user to pay bills on-line by "writing" an electronic check. The bill payment system 25 may be any known on-line bill payment system, such as the Fidelity Bill Pay$^{SM}$ system.

The retirement planning system 26 is configured to operate in different ways depending upon whether the user is retired. If the user is not retired, the retirement planning system 26 is configured to project the amount of money a user must save per period (e.g., per month) in order to meet his retirement objectives. The retirement planning system 26 analyzes the transactions that occur over a period to determine if the user is on track with his or her retirement savings goals. If the retirement planning system determines that the user is not on track, then the retirement planning system may calculate and notify the user of the shortage. If the user is retired (and is drawing upon his or her retirement assets), then the retirement planning system 26 is configured to analyze the transactions that occur over a period and provides the user with a projection of the value of the user's retirement assets given the current rate of spending and a projected future rate of return. A retirement planning system that may be incorporated within the account management system 10 is more fully described in a co-pending U.S. application titled "Asset Planning and Tracking" to John McDonough and Steve Elterich filed on the same date as this application and is incorporated here by reference.

In operation, the automated account management system 10 automatically manages each user's portfolio of accounts according to a set of customized rules established by the user. The user must first register with the system 10 and provide the system with information sufficient to enable it to automatically manage the user's accounts through an activation session.

Figure 3:
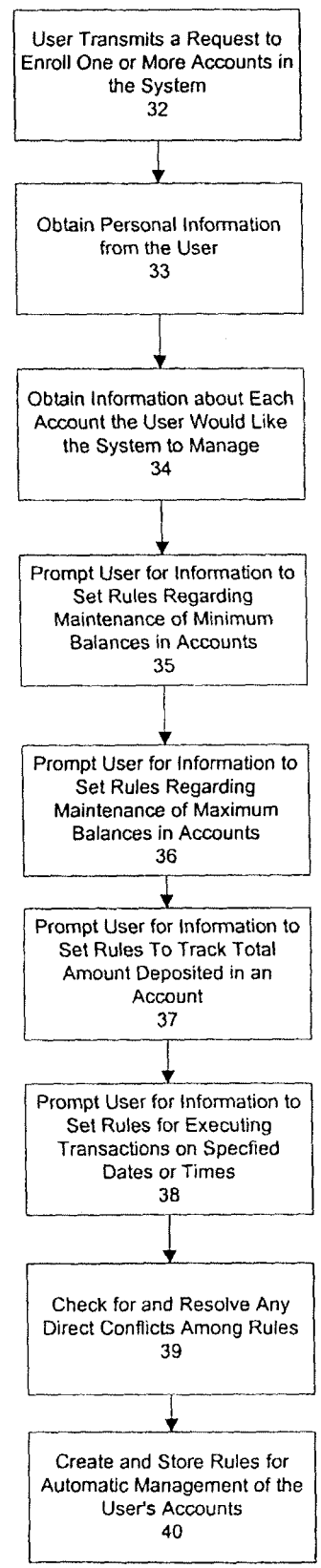
FIG. 3 is a flow chart of a user activation session.

As shown in FIG. 3, to establish account management rules, a user (e.g., user 1 shown in FIG. 1) initially establishes communication with the automated account management system 10 using the Internet and indicates a desire to place one or more of the user's accounts within the automated account management system by, for example, clicking on a button in a graphical user interface (block 32). In response, the rules manager prompts the user to enter personal information about the user such as the user's name, age, mailing address, e-mail address, martial status, or other personal information. When the user transmits his or her personal information back to the system, the rules manager stores the information in the rules database (block 33).

After the user enters his or her personal information, the rules manager 40 prompts the user to enter information about each of the accounts the user would like the system to manage (block 34). In this regard, the rules manager may prompt the user for the name of the financial institution that maintains the account, the account number, the routing number, and the type of account (e.g., checking, savings, money market, brokerage, liability, etc.). When the user transmits the necessary account information back to the system, the rules manager also stores this information in the rules database.

After entering information about each account, the rules manager then prompts the user for information that allows the system to build a set of rules to manage the user's accounts (blocks 35, 36, 37).

First, the rules manager prompts the user for information that indicates whether the user would like the system to maintain a minimum balance in one or more of the user's accounts (block 35). The rules manager may be configured to recommend that the user maintain minimum balances on any accounts for which there is a risk of an overdraft (e.g., a user's primary checking account) and any accounts that have a maintenance fee that is triggered if the account balance falls below a threshold amount (e.g., a money market account that charges a fee if the balance falls below $10,000). If the user identifies any accounts that the user would like to maintain a minimum balance, the rules manager asks the user to identify the minimum amount the user would like to maintain on the account. After the user identifies the minimum balances, the rules manager then prompts the user to identify accounts (called the source accounts) from which the user would like the system to transfer money if an account balance falls below the user-defined minimum.

After the user identifies the source account or accounts, the rules manager prompts the user for information about how the system should transfer money out of the source accounts. In this regard, the user is allowed to prioritize the account or accounts from which the system should draw funds. For example, the user may specify that the system should first attempt to draw funds from a savings account and then from a money market account. The user may specify that the system should only draw funds from an account if the account has a certain balance. To continue the above example, the user may specify that the system should only draw funds out of the savings account if it has a balance above $10,000, otherwise it should draw funds from the money market account. The user may also specify how much money should be transferred out of a source account in terms of an absolute dollar amount (e.g., transfer no more than $1,000 out of account A), a percentage of the source account balance (e.g., transfer no more than 25% of the balance of account A), or an amount not to cause the source account to fall below a certain amount (e.g., transfer no more than would cause the balance of the source account to fall below $1000). Continuing with the above example, the user may specify that the system should not transfer any more out of the savings account than would cause the savings account to fall below $8,000, and any remainder should be transferred out of the money market account.

Referring again to FIG. 3, after obtaining information about maintenance of a minimum account balance for one or more of the user's accounts, the rules manager prompts the user to identify any accounts in which the user would like to maintain a maximum account balance (block 36). The rules manager may recommend that the user maintain a maximum account balance in no or low interest bearing accounts in order to transfer excess funds to a higher yielding account. If the user identifies any accounts in which the user would like to maintain a maximum balance, the rules manager asks the user to identify the maximum amount the user would like to maintain on the account. After the user identifies the maximum balances, the rules manager then prompts the user to identify the account or accounts to which the user would like the system to transfer money if an account balance rises above the user-defined maximum. For example, the user may specify that if a checking account balance goes above $15,000, then the system should transfer the overage to a brokerage account. The user may also specify further rules that dictate how any excess funds should be distributed to other accounts. In this regard, the user may specify how much of the excess funds should be distributed to other accounts in terms of an absolute dollar amount (e.g., transfer the first $1,000 to a brokerage account and the remainder to a saving account) or percentage (e.g., transfer 25% to the brokerage account and 75% to the savings account).

After obtaining information about maintenance of a maximum account balance in one or more of the user's accounts, the rules manager prompts the user to identify any accounts for which the user would like the system to track the total amount of deposits over the course of a particular time period (block 37). The rules manager may recommend that the user have the system track the total amount deposited into an IRA or Section 529 account over the course of the user's tax year in order to ensure that the user does not overfund or underfund these accounts. If the user identifies any accounts for which the user would like the system to track the aggregate amount of deposits, the rules manager asks the user to identify the target amount the user would like to deposit into the account for the time period. In the case of an IRA or Section 529 account, the rules manager may indicate the maximum amount allowed by law for the particular tax year and provide the user with information about the consequences of funding these accounts in excess of the maximum amount allowed by law. After the user identifies the target amount that the user would like to deposit into the account over the time period, the rules manager may ask if the user would like the system to automatically fund the account at the user-specified level by making periodic transfers to the account. Through the rules manager, the user may further configure the system to send the user an alert (e.g., an e-mail message) once target amount has been deposited in the account, to stop the deposit of funds into the account once a target amount has been deposited, or to send a user an alert notifying the user of any shortage in the target amount at a particular time (e.g., 30 days prior to the end of the user's tax year).

After obtaining information about tracking the aggregate amount deposited into one or more accounts, the rules manager proceeds to prompt the user for information to allow the user to establish rules which cause the system to execute transactions on certain dates and times (block 38). For example, a user may have a paycheck directly deposited into a zero interest checking account on the second Friday of every month and may have a $2,000 mortgage payment due the first day of the month. This user may configure system to transfer $2,000 of the direct deposit to a interest-bearing money market account at the end of the second Friday of the month. The user may further configure the system to electronically transfer the $2,000 mortgage payment to the mortgage holder on the due date. In this way, the user is able to set aside and earn interest on money that is earmarked for the payment of a fixed, recurring expense.

The user may also configure the system to automatically pay bills on their due date. For example, if the user has a liability account with an electric company that the user is obligated to pay each month, the system may track the monthly balance of the account and automatically pay the balance of the account from an asset account on the due date of the bill.

After the user provides information regarding any date or time based management rules, the rules manager creates a proposed set of rules and scans the rules to ensure that there are not direct conflicts among the rules (block 39). A direct conflict among the rules occurs when two or more rules seek to have the system execute conflicting actions. For example, a rule that instructs the system to maintain a $10,000 balance in a checking account would directly conflict with a rule to transfer any funds in excess of $9,000 from the checking account to a money market account. If the set up module detects any direct conflicts among the rules, it prompts the user for information to resolve the conflict.

Once the rules manager determines that there are no direct conflicts, it displays the proposed rules to the user for the user to edit, delete or supplement. Once the user is satisfied with the set of rules built by the rules manager, the user transmits a signal indicating the user's approval of the proposed rules. After the rules manager receives the user's approval, it stores the set of rules in the rules database and sends the user a confirmation message (block 40). At this point the rules engine is able to automatically manage the users accounts in accordance with the rules.

Once the user has activated the automated account management system, the user can update the rules at any time by transmitting a request to change the user's account management rules. Upon receipt of a message indicating the user would like to change his or her account management rules, the rules manager displays the current set of rules to the user and prompts the user for information indicating if the user would like to add a rule, delete a rule or edit a rule. After the user has provided the rules manager with information indication how the user would like to modify the rules, the rules manager creates a new proposed set of rules, checks the rules for conflicts, and displays them to the user. Once the user indicates his or her satisfaction with the new set of rules, the rules manager overwrites the previous set of rules in the rules database with the new set.

The information transferred between the user and the rules manager 28 can be provided through a human operator 18, 19 (e.g., a customer service representative, a licensed broker or a licensed financial advisor) during an activation session or an update session. For example, a licensed broker or financial advisor can engage the user in a discussion about the management of the user's resources and obtain information from the user through a telephone call or a face-to-face meeting and enter the appropriate information into the rules manager 28. Similarly, a customer service representative can be contacted by the user in order to assist the user with setting up the rules, using the money transfer system 24, the bill payment system 25 or the retirement planning system 26.

Figure 4:
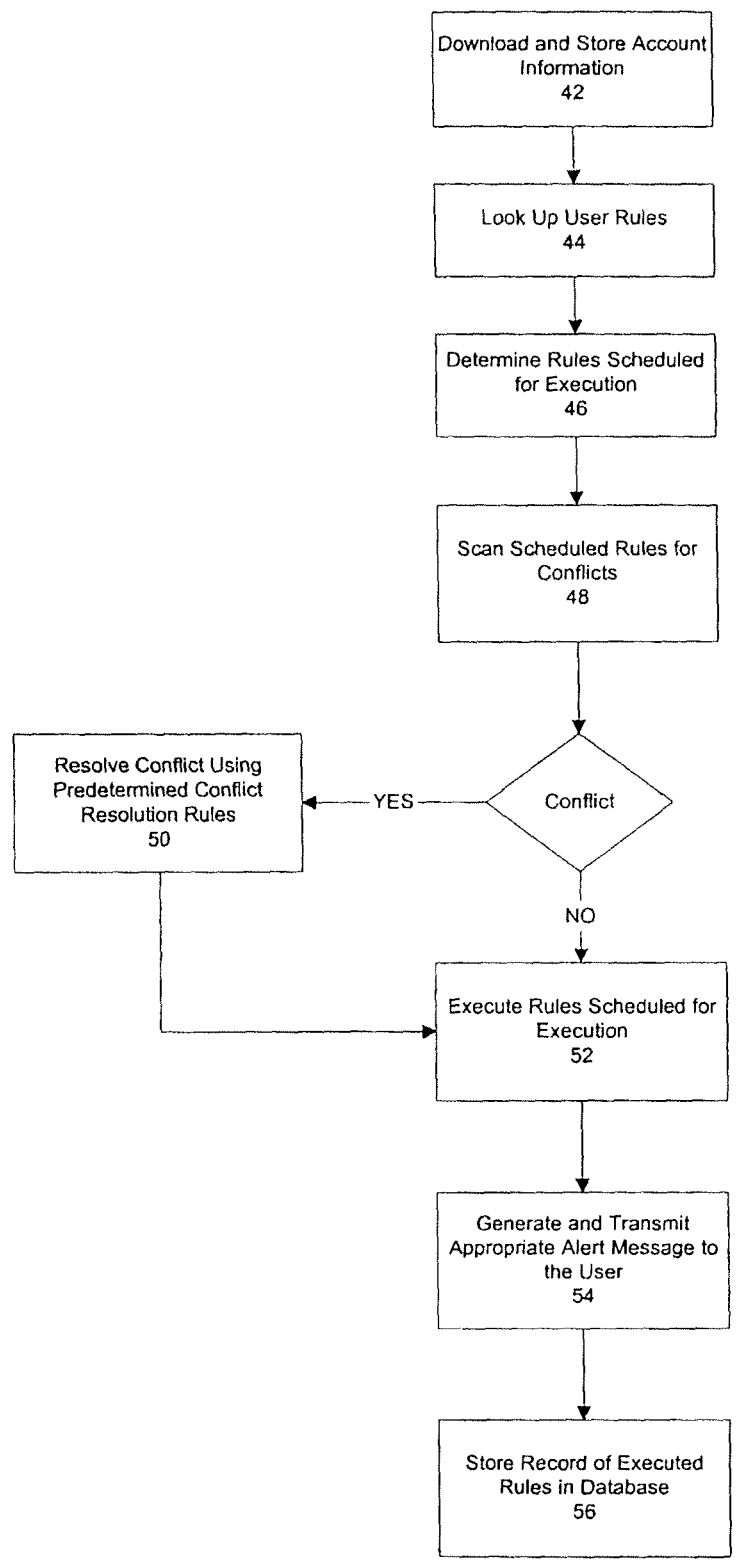
FIG. 4 is a flow chart of an operation of an account management system.

As shown in FIG. 4, after a set of rules has been stored for a user, the automated account management system 10 manages the user's portfolio of accounts in accordance with the rules. In this regard, the aggregation system is configured to periodically (e.g., at 8:00 am each business day) download and store in the personal financial database 27 (shown in FIG. 2) account data for each users' portfolio of accounts (block 42).

After the aggregation system has stored a user's account data, it transmits a message to the rules engine indicating that the aggregation system has updated the account data for a particular user. Upon receipt of a message that the aggregation system has updated the account data for a user, the rules engine looks up the rules stored for that user in the rules database (block 44) and determines which, if any, of the user rules should be executed (block 46).

After determining the rules set for execution, the rules engine scans the rules to determine if there is any conflict among the rules set for execution (block 48). A conflict arises when execution of a rule would cause the system to violate another rule. For example, a user may have a rule to transfer any funds in excess of $10,000 from account "A" into account "Z". The user may also have another rule to maintain a balance of $25,000 in accounts "A" and "B".

If the rules engine determines that there is a conflict among the rules, it uses a predetermined set of conflict resolution rules to resolve the conflict (block 50). For example, the conflict resolution rules may provide that a date-based rule always takes priority over a balance-based rule or a rule to maintain a minimum balance takes priority over a rule to transfer excess funds out of an account.

If the rules engine determines that there is no conflict among the rules set for execution or after the rules engine has resolved any conflicts among the rules, the rules engine then executes the rules (block 52).

If execution of one of the rules indicates that the user is to be sent an alert message (e.g., to alert the user that the balance has reached a certain threshold) or if execution of one of the rules causes the system to transfer money into or out of one or more of a user's accounts, then the rules engine generates and transmits an appropriate message to the user (e.g., via an e-mail to a user's electronic mailbox or a text-message to a user's cell phone, pager or wireless personal data assistant (PDA)) indicating the alert or the action taken by the system (block 54).

When the rules engine executes an account transaction or sends an alert message, a record of this action is stored in the personal financial database 42 (shown in FIG. 2) (block 56). At the end of each business day, the entire personal financial database may be copied on a backup storage device for use if data in the personal financial database becomes lost or corrupted.

At the end of a particular period (e.g., at the end of a month), the rules engine produces a statement showing a balance and a transaction history for the period for each of the user's accounts. This statement may sent electronically via e-mail or may be printed out and mailed to the user.

Additionally, the system may be configured to allow the user to view the current balance and transaction history of each of the user's accounts at any time by accessing this information using a secure Internet website. The system may also be configured to allow a customer service representative, broker or financial advisor to access this information on-line (e.g., through the Internet or an intranet). In this way, a customer service representative, broker or financial advisor is able get a picture of the user's financial resources and spending habits and work to formulate a savings and investment plan tailored for the individual user.

In order to save processing resources, the rules engine may be configured to build an event list for the upcoming business day at a time when few account transactions are expected to be processed (e.g., between midnight and 8:00 am Eastern time). The event list is built by scanning the rules database and extracting any balanced-based rules and any purely date or time-based rules that are expected to occur the next business day. In this way, the rules engine does not have to execute purely date or time-based rules that are not scheduled to occur on the particular business day and thus may save processing resources.

In addition to automated control of a user's portfolio of accounts, the account management system 10 includes a money transfer system 24 and a bill payment system 25 that allow a user transfer money between account or write checks or on-line through a graphical user interface. As previously mentioned, the money transfer system 24 and bill payment system 25 may be any known electronic money transfer system or on-line check writing system. Each transaction generated by a user through the money transfer system 24 and the bill payment system 25 is recorded within the personal financial data database 27.

Other embodiments are within the scope of the following claims. For example, an automated account management system may be configured by the user to transmit a message to asking the user's approval, e.g., through an e-mail message or a SMS/SMTP text-message, of a transfer of funds to or from an account when the system detects the account value has reached a certain threshold. Similarly, an automated account management system may be configured to allow the user to establish rules that cause the system to send a notification message, for example, an e-mail message, should the balance of an account (or group of accounts) reach a certain threshold. Also, in addition to specifying minimum balances on single accounts, the user may establish rules to cause the system to maintain a certain aggregated balance across multiple accounts. For example, a user may wish to always maintain $25,000 in cash across all of the user's accounts as a "safety net", and set up rules to ensure that the system maintains $25,000 across the user's liquid asset accounts (e.g., checking accounts, savings accounts, or money market accounts).

What is claimed is:

1. A system comprising:
   a processing device; and
   a storage device configured to store instructions that are executable by the processing device to cause the processing device to:
      generate a set of management rules for a set of accounts;
      scan the set of management rules for direct conflicts among the rules that cause the system to executing conflicting actions;
      resolve the direct conflicts among the management rules based on user information;
      store, in a database and based on the direct conflict resolution, remaining management rules;
      detect an update to account data of a first account in the set of accounts;
      identify, from the remaining management rules and one or more other management rules, rules for execution against updated account data, with the rules set for execution comprising a first rule, the first rule specifying a first balance value at which the first account should be maintained, and a second rule specifying a second balance value at which the first account should be maintained;
      identify an execution conflict between the first rule and the second rule;
      apply one or more conflict resolution rules to resolve the execution conflict; and
      following resolution of the execution conflict:
         cause an automatic transfer of funds between the first account and a second account based on a comparison of a current balance of the first account with the first balance value or the second balance value of the first account based on the resolution of the execution conflict.

2. The system of claim 1, wherein the processing device is configured to cause the transfer of funds from the second account to the first account if the current balance of the first account is less than the first balance value of the first account.

3. The system of claim 1, wherein the processing device is configured to cause the transfer of funds from the first account to the second account if the current balance of the first account is greater than the first balance value of the first account.

4. The system of claim 3, wherein the instructions further cause the processing device to:
   generate a message indicating that funds were transferred into the second account; and
   transmit the message to a computing device of a user.

5. The system of claim 1, wherein the account data comprises first account data, and wherein the instructions further cause the processing device to:
   download second account data for the first account;
   store the second account data in one or more data repositories; and
   update the first account data associated with the first account with the second account data.

6. The system of claim 5, wherein the instructions further cause the processing device to:
   transmit a message indicating that the first account data for the first account has been updated with the second account data.

7. The system of claim 1, wherein the instructions further cause the processing device to:
   determine the one or more conflict resolution rules associated with the first account.

8. The system of claim 1, wherein the instructions further cause the processing device to:
   determine one or more time and date based rules to be executed on a particular day; and
   populate a list of rules for execution with the determined one or more time and date based rules.

9. A system comprising:
   a processing device; and
   a storage device configured to store instructions that are executable by the processing device to cause the processing device to:
      generate a set of management rules for a set of accounts;

scan the set of management rules for direct conflicts among the rules that cause the system to executing conflicting actions;

resolve the direct conflicts among the management rules based on user information;

store, in a database and based on the direct conflict resolution, remaining management rules;

detect an update to account data of a first account in the set of accounts;

identify, from the remaining management rules and one or more other management rules, rules for execution against updated account data, with the rules set for execution comprising a first rule, the first rule specifying a minimum balance value at which the first account should be maintained, and a second rule specifying a particular balance value at which the first account should be maintained;

identify an execution conflict between the first rule and the second rule;

apply one or more conflict resolution rules to resolve the execution conflict; and following resolution of the execution conflict:

cause an automatic transfer of funds between the first account and a second account based on a comparison of a current balance of the first account with the minimum balance value of the first account or with the particular balance value of the first account based on the resolution of the execution conflict.

10. The system of claim 9, wherein the instructions further cause the processing device to:

determine the one or more conflict resolution rules associated with the first account.

11. The system of claim 9, wherein the instructions further cause the processing device to:

determine one or more time and date based rules to be executed on a particular day; and populate a list of rules for execution with the determined one or more time and date based rules.

12. The system of claim 9, wherein the processing device is configured to cause the transfer of funds from the second account to the first account if the current balance of the first account is less than the minimum balance value of the first account.

13. The system of claim 9, wherein the processing device is configured to cause the transfer of funds from the first account to the second account if the current balance of the first account is greater than the minimum balance value of the first account.

14. The system of claim 13, wherein the instructions further cause the processing device to:

generate a message indicating that funds were transferred into the second account; and transmit the message to a computing device of a user.

15. The system of claim 9, wherein the account data comprises first account data, and wherein the instructions further cause the processing device to:

download second account data for the first account;

store the second account data in one or more data repositories; and update the first account data associated with the first account with the second account data.

16. The system of claim 15, wherein the instructions further cause the processing device to:

transmit a message indicating that the first account data for the first account has been updated with the second account data.

17. A system comprising:

a processing device; and a storage device configured to store instructions that are executable by the processing device to cause the processing device to:

generate a set of management rules for a set of accounts;

scan the set of management rules for direct conflicts among the rules that cause the system to executing conflicting actions;

resolve the direct conflicts among the management rules based on user information;

store, in a database and based on the direct conflict resolution, remaining management rules;

detect an update to account data of a first account in the set of accounts;

identify, from the remaining management rules and one or more other management rules, rules for execution against updated account data, with the rules set for execution comprising a first rule, the first rule specifying a maximum balance value at which the first account should be maintained, and a second rule specifying a particular balance value at which the first account should be maintained;

identify an execution conflict between the first rule and the second rule;

apply one or more conflict resolution rules to resolve the execution conflict; and following resolution of the execution conflict:

cause an automatic transfer of funds between the first account and a second account based on a comparison of a current balance of the first account with the maximum balance value of the first account or with particular balance value at which the first account should be maintained based on the resolution of the execution conflict.

18. The system of claim 17, wherein the processing device is configured to cause the transfer of funds from the second account to the first account if the current balance of the first account is less than the maximum balance value of the first account.

19. The system of claim 17, wherein the processing device is configured to cause the transfer of funds from the first account to the second account if the current balance of the first account is greater than the maximum balance value of the first account.

20. The system of claim 17, wherein the instructions further cause the processing device to:

determine the one or more conflict resolution rules associated with the first account.

* * * * *